United States Patent
Berry et al.

(10) Patent No.: US 8,372,168 B2
(45) Date of Patent: Feb. 12, 2013

(54) HYDROGEN GENERATING FUEL CARTRIDGE WITH VOLUME EXCHANGE CONFIGURATION

(75) Inventors: Grant Berry, Hillsborough, NC (US); Keith A. Fennimore, Columbus, NJ (US); Richard M. Mohring, East Brunswick, NJ (US); Richard Rodican, New Haven, CT (US)

(73) Assignee: Protonex Technology Corporation, Southborough, MA (US)

( * ) Notice: Subject to any disclaimer, the term of this patent is extended or adjusted under 35 U.S.C. 154(b) by 1139 days.

(21) Appl. No.: 11/521,351

(22) Filed: Sep. 15, 2006

(65) Prior Publication Data

US 2007/0062115 A1   Mar. 22, 2007

Related U.S. Application Data

(60) Provisional application No. 60/717,243, filed on Sep. 16, 2005.

(51) Int. Cl.
*C10J 3/20* (2006.01)
(52) U.S. Cl. .......... 48/118.5; 48/61; 48/127.9; 422/236; 422/625

(58) Field of Classification Search .......... 422/105–116, 422/129–242
See application file for complete search history.

(56) References Cited

U.S. PATENT DOCUMENTS

| | | | |
|---|---|---|---|
| 6,534,033 B1 | 3/2003 | Amendola et al. | |
| 6,887,596 B2 | 5/2005 | Leban | |
| 2002/0122759 A1 | 9/2002 | Hayashi et al. | |
| 2003/0207164 A1 | 11/2003 | McElroy et al. | |
| 2004/0148857 A1 | 8/2004 | Strizki et al. | |
| 2005/0000234 A1 | 1/2005 | Kimbara et al. | |
| 2005/0074643 A1* | 4/2005 | Adams et al. | 429/19 |
| 2006/0191198 A1* | 8/2006 | Rosenzweig et al. | 48/61 |
| 2007/0036711 A1* | 2/2007 | Fisher et al. | 423/648.1 |

FOREIGN PATENT DOCUMENTS

WO   WO 2004/091003 A2   10/2004

* cited by examiner

*Primary Examiner* — Imran Akram
(74) *Attorney, Agent, or Firm* — Edwards Wildman Palmer LLP; Christine C. O'Day; George N. Chaclas (57) ABSTRACT

A hydrogen generation fuel cartridge system which can be removably connected to a fuel cell power module is disclosed. The removable hydrogen generation fuel cartridge comprises a fuel storage module and a hydrogen generation system balance of plant (BOP) that is interchangeable with each module. All controls are preferably contained in the BOP. A heat exchanger may be employed to control the temperature of the cartridge and components such as the reaction chamber.

23 Claims, 6 Drawing Sheets

HYDROGEN GENERATING FUEL CARTRIDGE WITH VOLUME EXCHANGE CONFIGURATION

CROSS-REFERENCE TO RELATED APPLICATIONS

This application claims the benefit of U.S. Provisional Application Ser. No. 60/717,243, filed Sep. 16, 2005, the entire disclosure of which is incorporated herein by reference.

FIELD OF THE INVENTION

The invention relates to systems for generating hydrogen gas. More particularly, the invention relates to a hydrogen generation fuel cartridge system which can be removably connected to a fuel cell power module.

BACKGROUND OF THE INVENTION

Although hydrogen is the fuel of choice for fuel cells, its widespread use is complicated by the difficulties in storing the gas. Many hydrogen carriers, including hydrocarbons, metal hydrides, and chemical hydrides are being considered as hydrogen storage and supply systems. In each case, specific systems need to be developed to release the hydrogen from its carrier, either by reformation as in the case of hydrocarbons, desorption from metal hydrides, or catalyzed hydrolysis from chemical hydrides and water.

The advantage of fuel cell power systems over batteries is that they are readily refuelable, and therefore can contain a "replaceable" fuel cartridge, and a "permanent" power module. A hydrogen fuel power system for small applications should ideally be compact and lightweight, have a high gravimetric hydrogen storage density, and be operable in any orientation. Additionally, it should be easy to match the control of the system's hydrogen flow rate and pressure to the operating demands of the fuel cell.

BRIEF SUMMARY OF THE INVENTION

The invention relates to a removable hydrogen generation fuel cartridge comprising a fuel storage module and a hydrogen generation system balance of plant (BOP) that is interchangeable with each module. All controls are preferably contained in the BOP. A heat exchanger, such as a fan, may be preferably employed to control the temperature of the cartridge and components such as the reaction chamber. Other suitable heat exchanger means include radiators and heat fins.

BRIEF DESCRIPTION OF THE DRAWINGS

A complete understanding of the present invention may be obtained by reference to the accompanying drawings when considered in conjunction with the following detailed description, in which.

DETAILED DESCRIPTION OF THE INVENTION

The present invention provides a fuel cartridge system for use with fuel cell power systems which; composes a fuel storage module and a separable balance of plant (BOP) module comprising fuel regulator controls and other controls that is interchangeable with each fuel storage module. The fuel storage module may be disposable or refillable.

The BOP module can be connected to the fuel storage module via any suitable engagement mechanisms, such as clasps, latches, or quarter turn connectors, among others. For example, the BOP module may be screwed onto the fuel storage module. The BOP module comprises fuel metering controls, and safety controls such as pressure relief valves. In some embodiments of fuel cartridge systems of the present invention, the BOP module can store hydrogen in a ballast chamber and include a hydrogen outlet.

Fuel cartridge systems of the present invention preferably include a heat exchanger to manage the temperature of the fuel cartridge and/or the reactor. The heat exchangers may include, for example, fans, radiators, and heat fins, among others. The heat exchanger may be included within the BOP module, or may be a separate component. The heat exchanger can be incorporated into a power module section to minimize the need for liquid-liquid coolant connections between the fuel cartridge and the power module, and to facilitate heat transfer from the fuel cell to the reaction chamber. In such cases, the reaction chamber is preferably in thermal contact with the power module. The use of heat exchange elements to ensure that the incoming fuel feed and reaction chamber are at the optimal temperature for hydrogen generation is described in co-pending U.S. patent application Ser. No. 10/867,032, entitled "Catalytic Reactor for Hydrogen Generation Systems," the disclosure of which is hereby incorporated by reference.

The fuel storage module is preferably configured for volume exchanging storage of the hydrogen generation fuel and products of the hydrogen generation reaction. Useful volume exchanging configurations include moveable pistons or walls and flexible bladders. Fuel is pumped to a reaction chamber where it produces hydrogen. The reaction chamber may be located within the fuel storage module or within the BOP module. Preferably, low cost or limited use catalyst systems are located within the fuel storage module for disposal, and longer lifetime catalyst systems are located within the BOP module for repeated use with a plurality of fuel storage modules. In some embodiments of the present invention, the fuel storage module can provide hydrogen storage and delivery functions.

Hydrogen generation fuels suitable for the fuel cartridge system of the present invention include reformable fuels. As used herein, reformable fuels are any fuel material that can be converted to hydrogen via a chemical reaction in a reaction chamber, and include, for example, hydrocarbons and chemical hydrides. Hydrocarbon fuels useful for systems in accordance with the invention include methanol, ethanol, propane, butane, gasoline, and diesel, among others. Hydrocarbons undergo reaction with water to generate hydrogen gas and carbon oxides. Methanol is preferred for such systems in accordance with the present invention.

Suitable chemical hydrides include, but are not limited to, boron hydrides and ionic hydride salts. Suitable boron hydrides include, without intended limitation, the group of borohydride salts [M(BH$_4$)$_n$], triborohydride salts [M(B$_3$H$_8$)$_n$], decahydrodecaborate salts [M$_2$(B$_{10}$H$_{10}$)$_n$], tridecahydrodecaborate salts [M(B$_{10}$H$_{13}$)$_n$], dodecahydrododecaborate salts [M2(B$_{12}$H$_{12}$)$_n$], and octadecahydroicosaborate salts [M$_2$(B$_{20}$H$_{18}$)$_n$], where M is an alkali metal cation, alkaline earth metal cation, aluminum cation, zinc cation, or ammonium cation, and n is equal to the charge of the cation; and neutral borane compounds, such as decaborane (14) (B$_{10}$H$_{14}$), ammonia borane compounds of formula NH$_x$-BH$_y$, wherein x and y independently=1 to 4 and do not have to be the same, and NH$_x$RBH$_y$, wherein x and y independently=1 to 4 and do not have to be the same, and R is a methyl or ethyl group. These chemical hydrides may be utilized in mixtures or individually.

Ionic hydride salts include, without intended limitation, the hydrides of alkali metals and alkaline earth metals such as lithium hydride, sodium hydride, magnesium hydride, and calcium hydride and having the general formula MH$_n$ wherein M is a metal cation, and n is equal to the charge of the cation. The chemical hydrides react with water to produce hydrogen gas and a metal salt.

Chemical hydrides may be used as a dispersion or emulsion in a nonaqueous solvent, for example, as commercially available mineral oil dispersions. Such mixtures may include additional dispersants as disclosed in U.S. patent application Ser. No. 11/074,360, entitled "Storage, Generation, and Use of Hydrogen," the disclosure of which is hereby incorporated herein by reference in its entirety. In particular, many of the boron hydride compounds are water soluble and stable in aqueous solution. A stabilizer, preferably a metal hydroxide, is typically added to aqueous solutions of borohydride compounds in water, and a typical fuel solution comprises about 10% to 35% by wt. sodium borohydride and about 0.01 to 5% by weight sodium hydroxide as a stabilizer. A process for generating hydrogen from such a stabilized metal hydride solution is described in U.S. Pat. No. 6,534,033, entitled "A System for Hydrogen Generation," the disclosure of which is hereby incorporated herein by reference in its entirety.

As an example of a reformable chemical hydride fuel, borohydrides react with water to produce hydrogen gas and a borate in accordance with Equation 1 where MBH$_4$ and MBO$_2$, respectively, represent an alkali metal borohydride and an alkali metal metaborate:

MBH$_4$+(2+n) H$_2$O→MBO$_2$. n H$_2$O+4 H$_2$+heat     Equation (1)

A simplified stoichimetry is provided in Equation 1; wherein n is variable and is determined by the temperature and nature of the borohydride, among other factors. For sodium borohydride (NaBH$_4$), n preferably is 2.

Sodium borohydride is generally preferred for hydrogen generation due to its gravimetric hydrogen storage density of 10.9%, its multi-million pound commercial availability, its relative stability in alkaline aqueous solutions, and its comparatively high solubility in water, about 35% by weight. Typically, the fuel solution comprises about 10% to 35% by weight sodium borohydride and about 0.01 to 5% by weight sodium hydroxide.

The reaction chamber preferably includes a hydrogen generation catalyst to promote the conversion of the reformable fuel to hydrogen, for example, the hydrolysis of chemical hydrides and steam reforming of hydrocarbons. For hydrogen generation systems of the present invention, the reaction chamber is preferably packed with a catalyst metal supported on a substrate. The catalyst may take the form of beadys rings, pellets or chips, for example. Structured catalyst supports such as honeycomb monoliths or metal foams can be used to control the plug flow pattern and mass transfer of the fuel to the catalyst surface.

Suitable supported catalysts for boron hydride systems are provided, for example, in U.S. Pat. No. 6,534,033 entitled "System for Hydrogen Generation," the disclosure of which is incorporated herein by reference. Suitable transition metal catalysts for the generation of hydrogen from a metal hydride solution include metals from Group 1B to Group VIIIB of the Periodic Table, either utilized individually or in mixtures, or as compounds of these metals. Representative examples of these metals include, without intended limitation, transition metals represented by the copper group, zinc group, scandium group, titanium group, vanadium group, chromium group, manganese group, iron group, cobalt group and nickel group. Specific examples of useful catalyst metals include, without intended limitation, ruthenium, iron, cobalt, nickel, copper, manganese, rhodium, rhenium, platinum, palladium, and chromium. Suitable carriers include carbons such, as activated carbon, coke, or charcoal; ceramics and refractory inorganic oxides such as titanium dioxide, zirconium oxide, cerium oxides; metal foams, sintered metals and metal fibers; and perovskites with the general formula ABO$_3$, where A is a metallic atom with a valence of +2 and B is a metallic atom with a valence of +4.

Suitable supported catalysts for hydrocarbon systems include, for example, metals on metal oxides. Specific examples of useful catalyst metals include, without intended limitation, copper, zinc, palladium, platinum, and ruthenium, and specific examples of useful catalyst metal oxides include, without intended limitation, zinc oxide (ZrO), alumina (Al$_2$O$_3$), chromium oxide, and zirconia (ZrO$_2$).

In fuel cartridge systems based on reformable fuel hydrogen generation systems, the fuel solutions may be conveyed from a fuel storage area through a reaction chamber to undergo a hydrogen generation reaction, for example, the reaction depicted in Equation (1) for borohydride compounds, and the resultant byproducts and hydrogen gas are separated in a hydrogen separation region contained within the fuel storage module, and the hydrogen gas fed to the fuel cell unit. For chemical hydride systems, the non-hydrogen products comprise a metal salt product and potentially water vapor. For hydrocarbons, the non-hydrogen products comprise carbon oxides (e.g., CO$_2$, CO) and potentially other contaminant gases. In the case of hydrocarbons, this hydrogen-rich gaseous stream is typically sent through an additional purification stage before being sent to the fuel cell unit. The hydrogen generation process and liquid fuel flow to the reaction chamber are preferably regulated by the BOP module in accordance with the hydrogen demands of the fuel cell.

Figure 1:
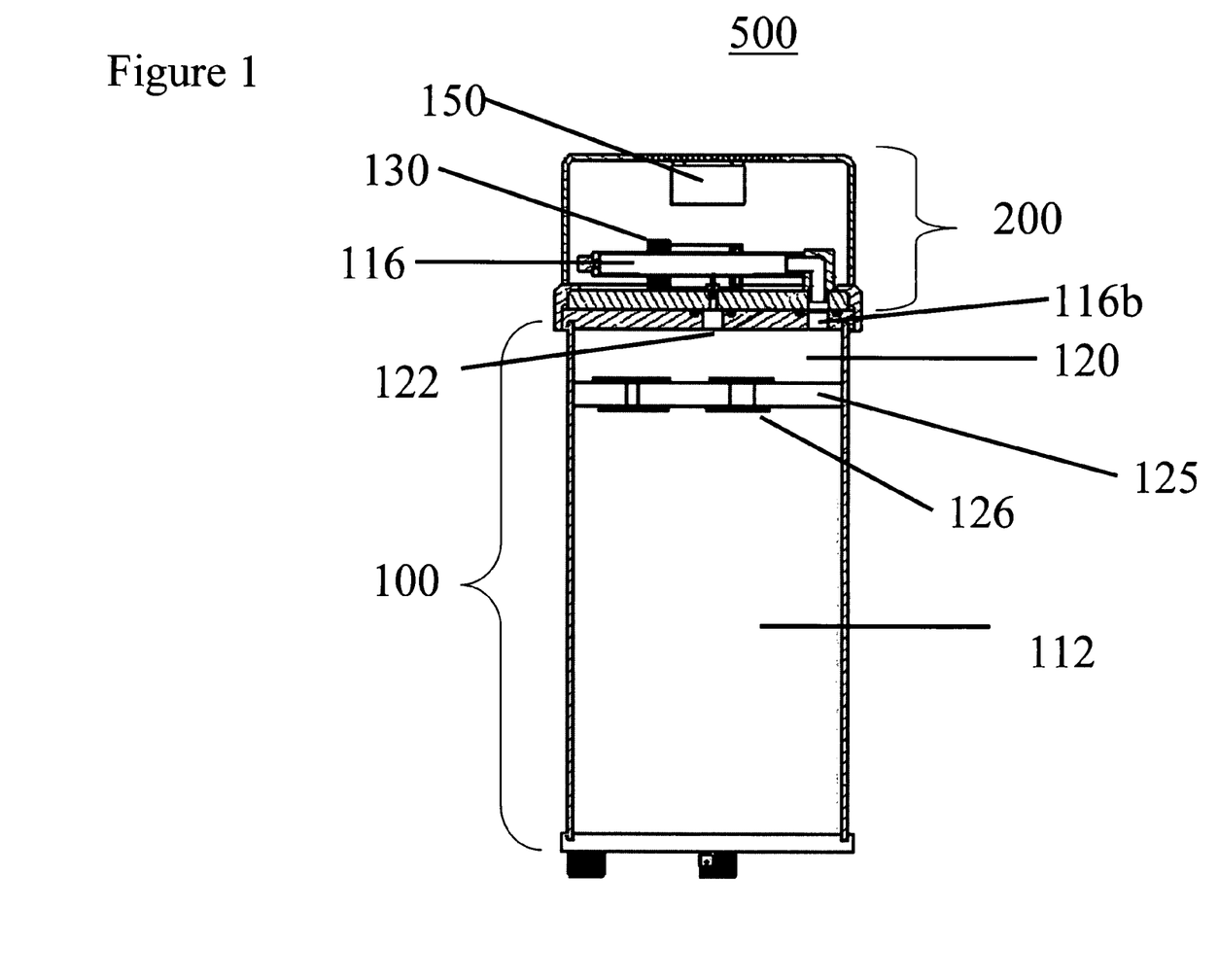
FIG. 1 is a schematic cross-sectional view of a fuel cartridge system comprising a balance of plant module according to an embodiment of the present invention.
Figure 2:
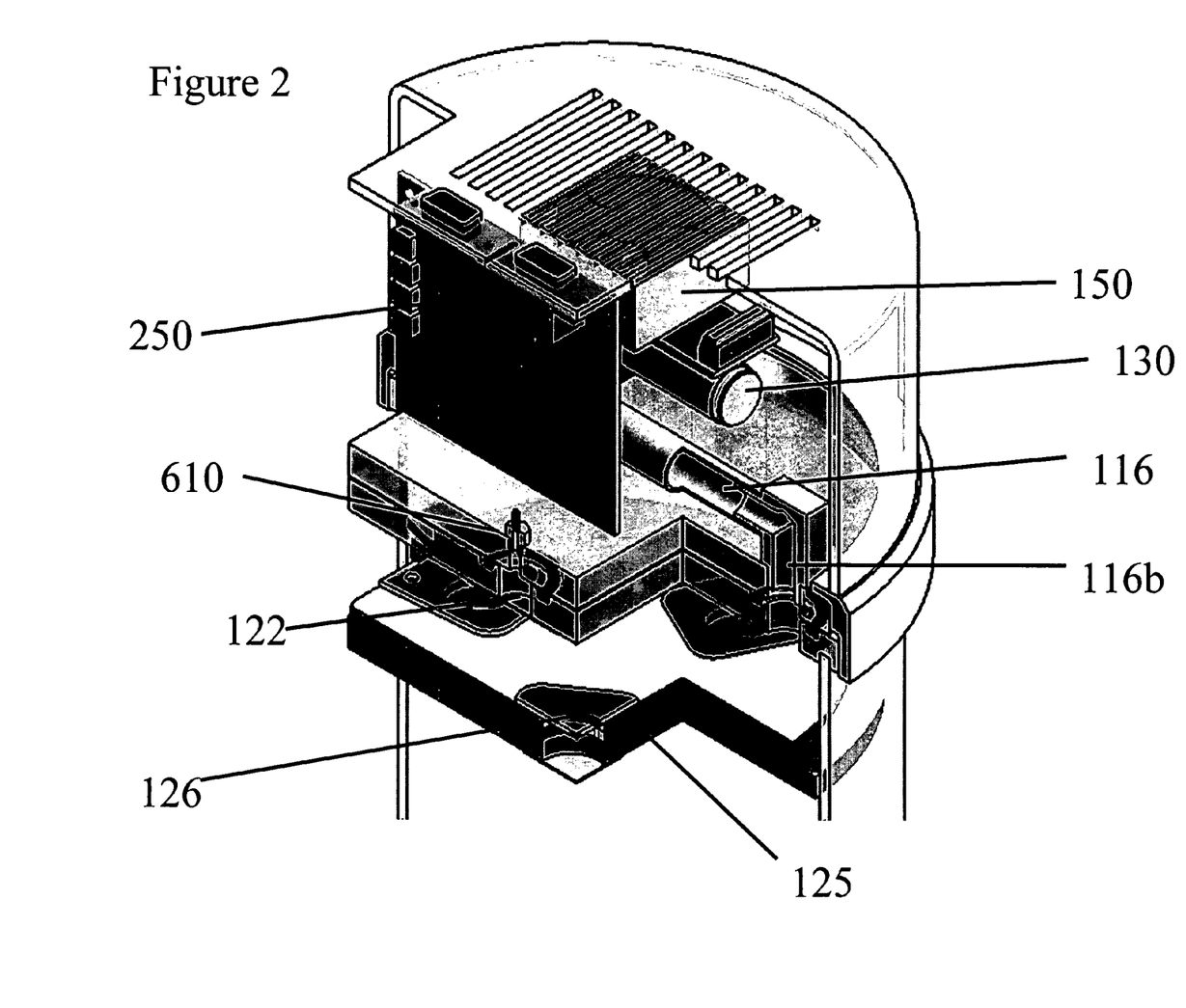
FIG. 2 is a perspective partial view of the BOP module of the fuel cartridge system of FIG. 1.
Figure 3:
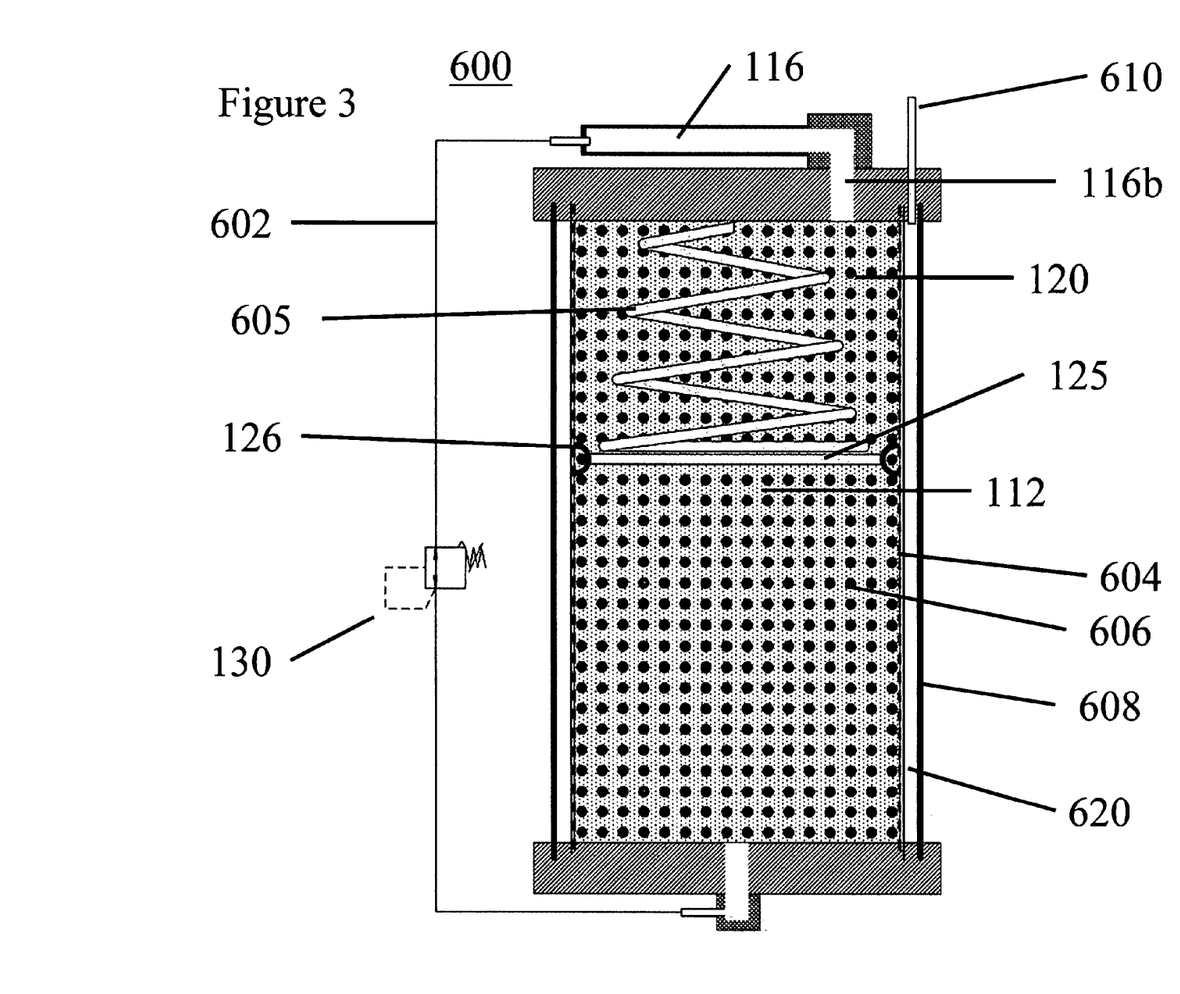
FIG. 3 is a schematic cross-sectional view of a fuel storage module according to another embodiment of the present invention.
Figure 4:
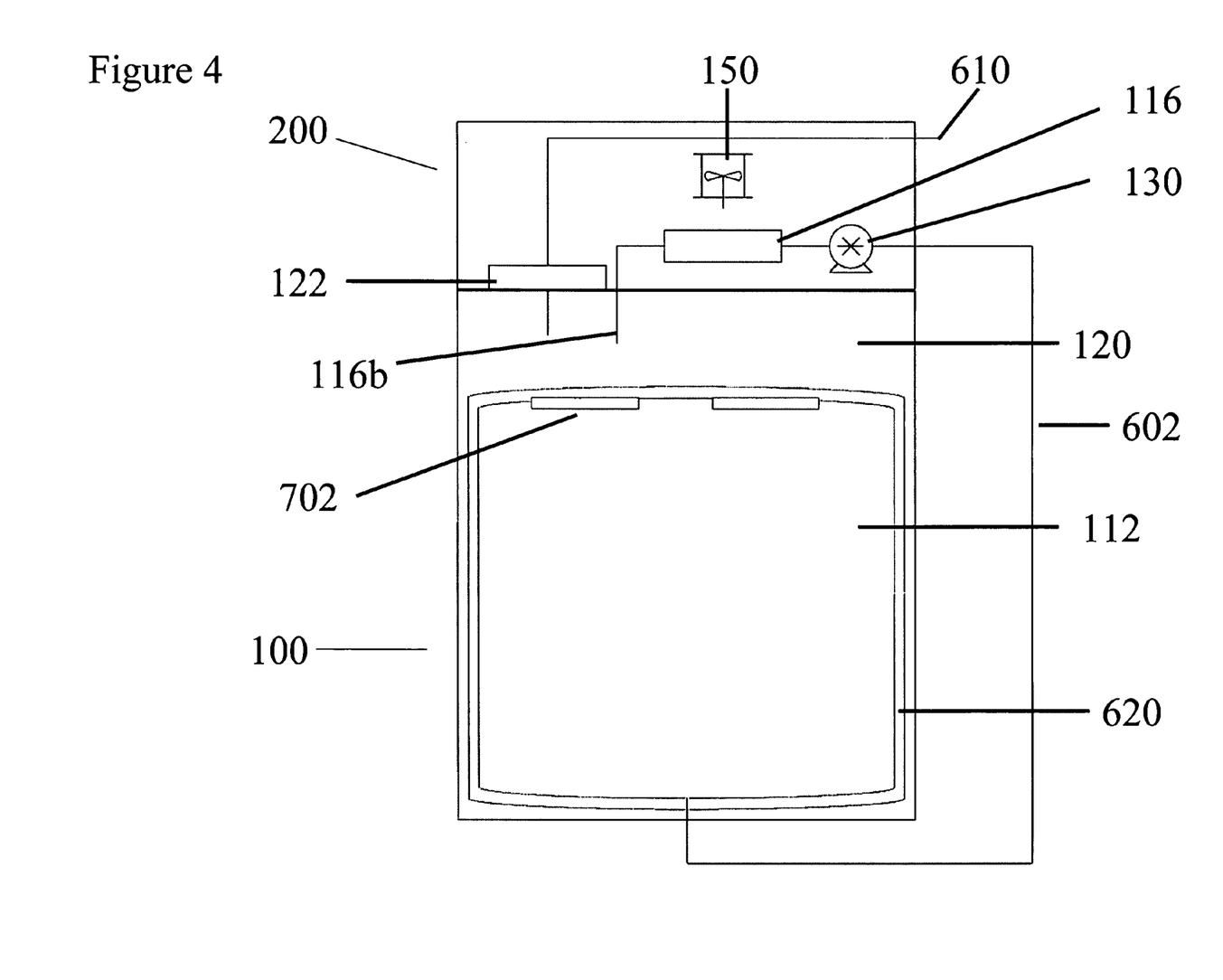
FIG. 4 is a schematic cross-sectional view of a fuel cartridge system comprising a balance of plant module according to an embodiment of the present invention.
Figure 5:
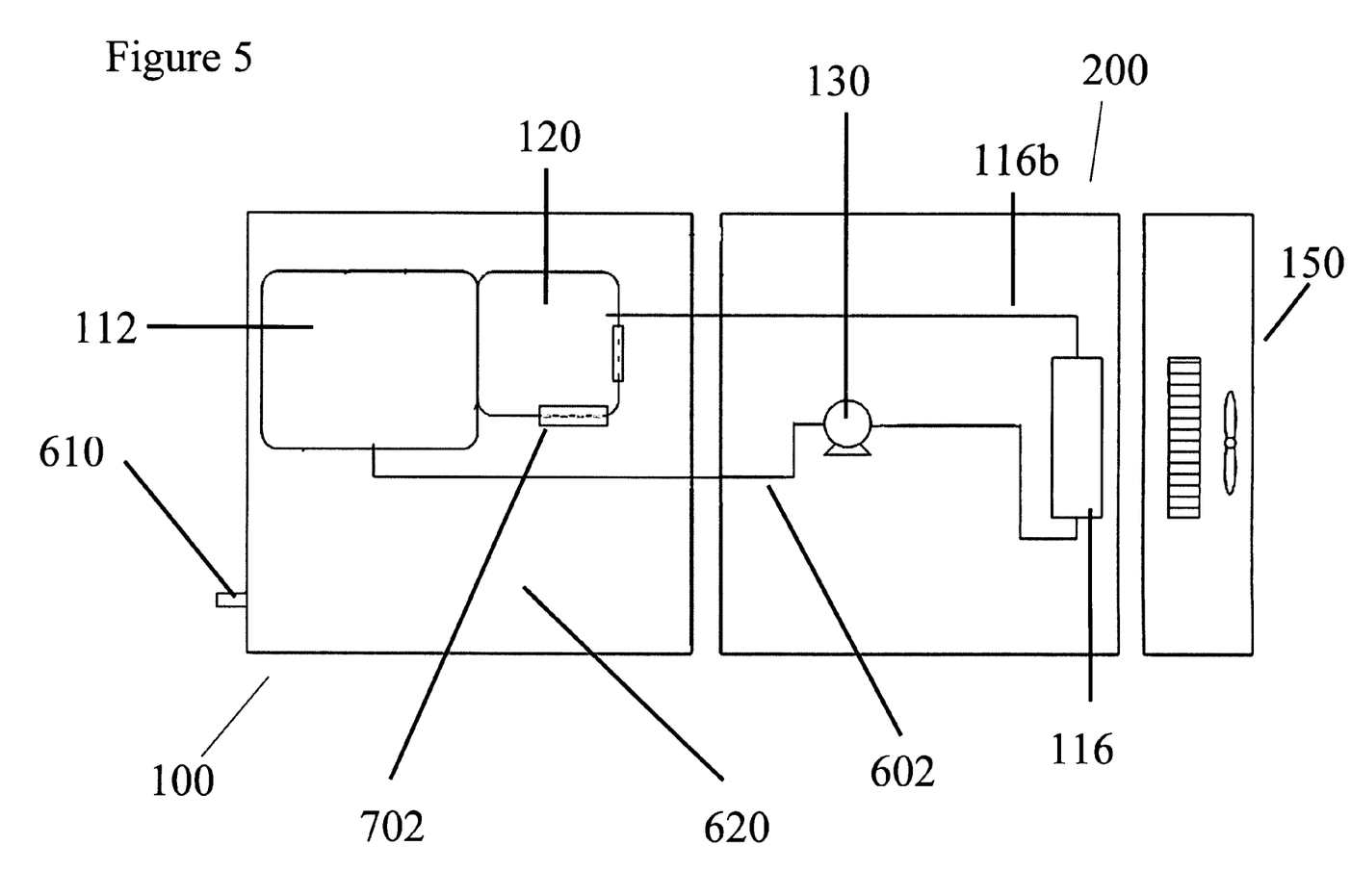
FIG. 5 is a schematic cross-sectional view of a fuel cartridge system comprising a balance of plant module according to an embodiment of the present invention.

Referring now to the drawings, where like elements are designated by like reference numerals, FIGS. 1 and 2 illustrate a first exemplary fuel cartridge system 500 comprising a fuel storage module 100 and a balance of plant module 200 in accordance with the present invention. FIG. 3 illustrates an exemplary fuel storage module 600 with passive controls in-which hydrogen separation is provided by the cylinder walls of the system. FIGS. 4 and 5 illustrate exemplary fuel cartridge systems comprising a fuel storage module 100 in which one or both of the fuel storage area 112 and the hydrogen separation area 120 are flexible chambers.

The size of the fuel cartridge is related to how much fuel is desired to be stored. The quantity of fuel is dependent on the energy requirements which is a function of both the desired power output and the runtime. The fuel cartridge system of the invention can be scaled for power systems that operate, for example, in the milliwatt range to the kilowatt range, by one skilled in the art according to the teachings herein.

Referring to FIGS. 1 and 2, an exemplary fuel cartridge system 500 comprises a fuel storage module 100 and a balance of plant module 200. The fuel storage module 100 comprises a fuel storage area 112 (or fuel chamber 112), and a hydrogen separation area 120 separated by at least one partition, such as a piston 125. A fuel regulator 130 (illustrated in FIG. 1 as pump 130), a reaction chamber 116 for hydrogen generation, and a hydrogen outlet 610 are also provided as part of the hydrogen generation system 500 of the present invention.

The partition 125 may include channels bounded by at least one membrane 126 incorporated within or adjacent to the piston and a check valve (not illustrated) incorporated into the piston/membrane assembly to allow any hydrogen produced in the fuel storage area 112 to be transported to the hydrogen separation area 120 (or, alternatively, be directed to atmosphere) while maintaining all fuel within area 112. Preferably, the perimeter of the partition 125 comprises a flexible material that creates a seal between the fuel storage and hydrogen separation areas. The moveable partition 125 can be made of a suitable material and structure so as to act as a thermal insulator to inhibit the transfer of heat from the byproduct to the fuel. Partition 125 may be connected to an optional spring (not illustrated) or other elastic member that has an intrinsic tension and can maintain an applied pressure on the fuel solution within the fuel storage area. The weight of the partition 125 may also be sufficient to apply a force to the fuel. Alternatively, partition 125 may simply "ride" on top of the fuel solution.

One or more of partitions 125 may be moveable such that the fuel and byproduct can occupy the same volume in a volume exchanging configuration. At least one of the fuel storage area 112 and hydrogen separation area 120 may further include flexible bladders to hold the fuel solution and/or byproducts.

The fuel storage chamber 112 contains a fuel solution which is fed, for example, using pump 130 through a fuel line to reaction chamber 116. Reaction chamber 116 contains a catalyst to promote the reaction of the fuel solution to produce hydrogen gas, for instance, as shown in Equation (1) for fuel solutions comprised of a borohydride compound, stabilizer agent, and water. The reaction results in the generation of hydrogen gas and byproducts which are transported to the hydrogen separation area 120 via a conduit 116b. The hydrogen is delivered through a conduit bounded by a hydrogen separation membrane 122 to the balance of plant module 200. Examples of suitable materials for membranes 122 and 126 for hydrogen separation include materials that are more permeable to hydrogen than to water, such as silicone rubber, polyethylene, polypropylene, polyurethane, fluoropolymers, or hydrogen-permeable metal membranes such as palladium-gold alloys.

Referring to FIG. 2, the balance of plant module 200 comprises a reaction chamber 116, a controller 250, a fuel regulator 130, a heat exchanger 150 (illustrated in FIG. 2 as a cooling fan), and at least one hydrogen inlet at membrane 122 connecting the BOP module 200 with the hydrogen separation region 120. The BOP module comprises at least one hydrogen outlet 610 configured to deliver hydrogen gas to a power module comprising a fuel cell or hydrogen-burning engine for conversion to energy, or a hydrogen storage device such as hydrogen cylinders, metal hydrides, or balloons. The fuel storage module 100 may be connected to the balance of plant module 200 in any suitable way.

Fuel regulator 130 meters the fuel from the fuel storage area 112 to the reaction chamber 116 through a conduit (not shown). The fuel conduit can be located internally within the fuel storage module 100 or can be positioned external of the fuel storage module 100. Fuel regulator 130 may be a pump or a valve in the fuel line (not, shown) and regulates flow of the fuel solution to the reaction chamber 116 to produce hydrogen gas and a byproduct. In the operation of the hydrogen gas generating system, partition 125 may apply a force on the fuel contained within the fuel storage chamber 112. For an actively controlled system using valves, for example, the controller would open a solenoid valve to meter the fuel solution in response to a system pressure reading from a pressure sensor. For a passively controlled system using valves, for example, a regulator valve controlled by a system parameter such as fuel pressure or system pressure is used to meter the fuel solution. The borate byproduct enters the hydrogen separation area 120 occupying the space on the other side of the moveable partition 125.

FIG. 3 illustrates another exemplary fuel storage module 600 useful in fuel cartridge systems according to the present invention in which hydrogen separation is provided by the cylinder wall 604 and allows a hydrogen ballast to be stored in hydrogen chamber 620 which forms at least part of the cylinder walls of the system. The fuel storage module 600 can be connected to a balance of plant module 200 which comprises fuel regulator controls to provide a fuel cartridge system that operates similarly to those of system 500 described above.

As illustrated in FIG. 3, the reaction chamber 116 is included with the fuel storage module. The fuel storage module 600 comprises a fuel storage area 112 (or fuel chamber 112), and a hydrogen separation area 120 separated by at least one partition, such as a piston 125. Areas 112 and 120 are bounded by an inner wall 604 which contains a plurality of hydrogen separators 606 at regular intervals. In one aspect, the inner wall 604 has individual hydrogen separators attached or affixed to its surface. In this and other embodiments of the invention, examples of suitable materials for separator 606 include materials that are more permeable to hydrogen than water, such as silicone rubber, polyethylene, polypropylene, polyurethane, fluoropolymers, or hydrogen-permeable metal membranes such as palladium-gold alloys. Alternatively, inner wall 604 could be a perforated sheet which bounds a larger hydrogen separator such that each perforation is blocked by the membrane. The fuel storage module 600 further comprises an outer housing 608 forming a gas storage region 620 between the wall of outer housing 608 and the inner wall 604.

Figure 3A:
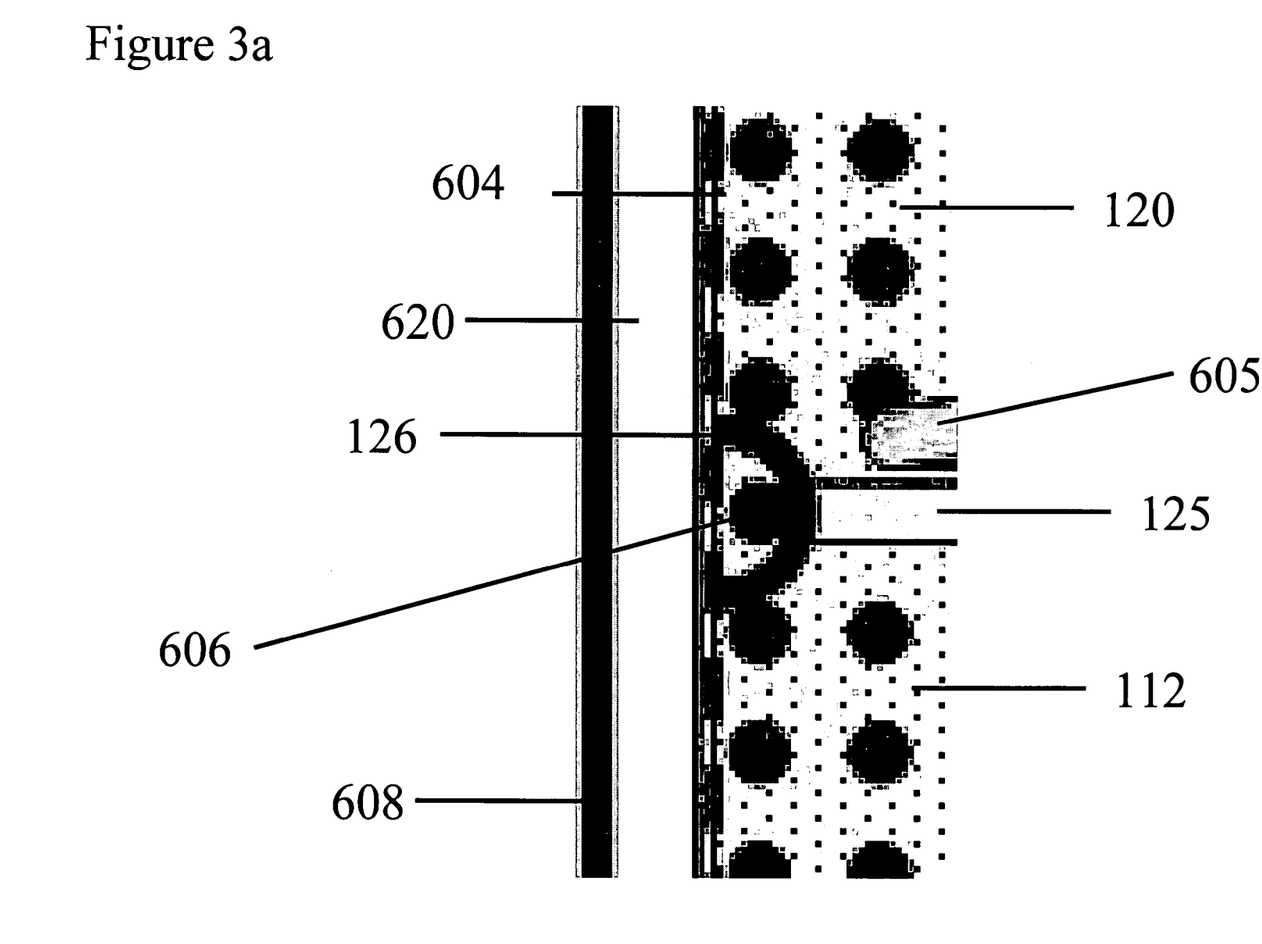
FIG. 3a is a detailed view of the piston and seal of a fuel storage module of FIG. 3.

A seal must be maintained between the fuel storage area or chamber 112 and the hydrogen separation area 120 to prevent any liquid penetrating the hydrogen separation area 120. Referring now to FIG. 3a, regularly spaced seals 126 are attached to the piston 125 to maintain a seal between the chambers. Examples of suitable seals 126 include, but are not limited to, lip seals, o-rings, square cut seals, and other seals used to seal a sliding piston to a cylinder wall. Due to the even spacing of the hydrogen separators 606 and the spacing of the seals 126, as fuel is consumed and the piston moves, at least a portion of the seal is in contact with and sealed on the inner wall 604.

The fuel storage module 600 illustrated in FIG. 3 is a passive system. An element such as spring 605 that has an intrinsic tension and can maintain an applied pressure may be used to supply constant force to the piston so that pressure is developed in the fuel storage area or chamber 112. The fuel solution is conveyed, for example, using a fuel regulator 130 such as a valve, through fuel line 602 to reaction chamber 116 to undergo the hydrogen producing reaction. Hydrogen gas and any byproducts are transported to the hydrogen separation area 120 via conduit 116b. The hydrogen is passed through the separator 606 into chamber 620 and is delivered through conduit 610 to the hydrogen consuming device. While the fuel line 602 is illustratively shown external to the fuel storage module 600, it may alternatively be located within the fuel storage module 600.

FIGS. 4 and 5 illustrate another exemplary fuel cartridge system comprising a fuel storage module 100 and a BOP module 200 in which one or both of the fuel storage area 112 and the hydrogen separation area 120 are flexible chambers. The flexible or movable nature of the chamber accommodates volume expansion and reduction within the two storage regions.

The chambers may be comprised of a flexible, liquid-tight material, such as nylon; polyurethane; polyvinylchloride; polyethylene polymers including low density polyethylene (LDPE), linear low density polyethylene (LLDPE), high density polyethylene (HDPE), polypropylene (PP), and ethylene-vinyl acetate copolymers (EVA); natural rubber;, synthetic rubber; metal foil or other material, or may be comprised of a non-flexible or rigid material, such as metal or plastic, which contains one or more movable partitions telescopically or otherwise to provide for a volume exchanging configuration.

Each chamber preferably contains at least one gas permeable membrane 702 in the wall thereof. The gas permeable membrane is preferably substantially impermeable to liquids and prevents solid and liquid materials from passing through the gas permeable membrane. Examples of suitable materials include materials that are more permeable to hydrogen than to water, such as silicone rubber, polyethylene, polypropylene, polyurethane, fluoropolymers, or hydrogen-permeable metal membranes such as palladium-gold alloys.

FIG. 4 illustrates an exemplary embodiment of a fuel cartridge system in which the fuel storage area 112 is a flexible chamber as described above. Optionally, fuel storage area 112 may be further enclosed by another flexible chamber to form a hydrogen storage region 620 and to collect any hydrogen that may form from the fuel solution in area 112. Hydrogen may be removed from this hydrogen storage region 620 via an outlet conduit (not illustrated). The balance of plant module 200 which comprises fuel regulator controls operates similarly to those of system 500 described above.

A two bag embodiment is illustrated in FIG. 5 in which both fuel storage area 112 and hydrogen separation area 120 are flexible chambers as described above. The balance of plant module 200 comprises fuel regulator controls and operates similarly to those of system 500 described above. As illustrated in FIG. 5, heat exchanger 150 may be separate from the BOP module 200. The heat exchanger 150 is preferably in thermal communication with the reaction chamber 116 or fuel storage module 100.

In reference to both FIGS. 4 and 5 and as described above, the fuel solution is transported from fuel storage area 112 via a conduit 602 to the reaction chamber 116 to undergo a hydrogen generation reaction. Hydrogen gas and reaction byproducts are conveyed via conduit 116b to the hydrogen separation region 120. The hydrogen gas can be withdrawn for delivery to a hydrogen consuming device via an hydrogen outlet 610 which may be present in the BOP module 200 (as in FIG. 4, for example) or in the fuel storage module 200 (as in FIG. 5, for example).

In reference to the embodiments disclosed above, the fuel regulator 130 has been illustrated as an element present in either the fuel storage module or the BOP module. In these and other embodiments of the present invention, the fuel regulator 130 may alternatively comprise a separable pump wherein a pump head resides in one of the fuel storage or BOP modules and a controller resides in the other of the fuel storage or BOP modules. Preferably, fuel regulator 130 comprises a pump head of, for example, a peristaltic pump, a piston pump, or a diaphragm pump, and a controller which comprises a motor or an electrical contact. In general, peristaltic and piston pumps operate through the use of a pump head comprised of a series of fingers in a linear or circular configuration or at least one piston which can compress the fuel line 602. The fingers may be in a variety of configurations and alternatively referred to as rollers, shoes, or wipers.

The compression of the fuel line, 602 by the fingers forces the liquid through the line. When the line is not compressed and open, fluid flows into the fuel line. A diaphragm pump configuration comprises a diaphragm in the wall of fuel line 602, check valves on the upstream and downstream sides of the diaphragm, and a pump head. In general, diaphragm pumps operate through the use of a pump head comprised of a, series of cams in a linear or circular configuration or at least one piston which can compress the diaphragm. The compression of the membrane by the fingers-forces the liquid through the line. When the membrane expands and is not compressed, fluid is drawn into the fuel line. The cams may be in a variety of configurations and alternatively referred to as rollers, shoes, or wipers. The check valves constrain and control the directional flow through the diaphragm and fuel line 602.

In another embodiment of a diaphragm pump configuration, fuel regulator 130 is a diaphragm that further comprises a piezoelectric crystal that is in electrical communication with controller which comprises an electrical contact. Upon the application of an oscillating voltage to the piezoelectric crystal, a diaphragm pumps fluid through the conduit line as described previously for the mechanically controlled diaphragm.

While the present invention has been described with respect to particular disclosed embodiments, it should be understood that numerous other embodiments are within the scope of the present invention. Thus, as disclosed herein, the reaction chamber may be present in either the BOP module 200 or in the fuel storage module 100. Hydrogen may be withdrawn from the fuel cartridge system via a hydrogen outlet present in either the BOP module 200 or in the fuel storage module 100.

The above description and drawings illustrate preferred embodiments which achieve the objects, features and advantages of the present invention. It is not intended that the present invention be limited to the illustrated embodiments. Any modification of the present invention which comes within the spirit and scope of the following claims should be considered part of the present invention.

What is claimed as new and desired to be protected by Letters Patent of the United States is:

1. A fuel cartridge system, comprising:
 a balance of plant module comprising: a reaction chamber and a fuel regulator;
 a fuel suitable for undergoing a hydrogen generating reaction to produce a mixture comprising hydrogen gas and byproducts;
 a fuel storage module defined by a rigid walled outer chamber comprising: a fuel storage chamber for storing the fuel and a mixture storage chamber for storing the mixture, wherein the fuel storage module is removably connected to the balance of plant module;
 a first conduit configured to convey the fuel from the fuel storage chamber to the reaction chamber, wherein a first portion of the first conduit resides in the fuel storage module and a second portion of the first conduit resides in the balance of plant module, wherein the first and second portions of the first conduit are removably connected, and wherein the fuel regulator is connected inline relative to the first conduit to regulate the transporting of fuel from the fuel storage chamber to the reaction chamber;

a second conduit configured to convey the mixture from the reaction chamber to the mixture storage area chamber, wherein a first portion of the second conduit resides in the fuel storage module and a second portion of the second conduit resides in the balance of plant module, and wherein the first and second portions of the second conduit are removably connected;

wherein the fuel storage chamber and the mixture storage chamber are disposed in a volume exchange configuration; and wherein the fuel cartridge system is configured such that essentially no hydrogen is removed from the mixture by the second conduit.

2. The fuel cartridge system of claim 1, wherein the fuel storage module is disposable or refillable.

3. The fuel cartridge system of claim 1, wherein the hydrogen generating fuel is a reformable fuel.

4. The fuel cartridge system of claim 1, wherein the hydrogen generating fuel is a material selected from the group consisting of hydrocarbons and chemical hydrides.

5. The fuel cartridge system of claim 1, wherein the hydrogen generating fuel is a chemical hydride selected from the group consisting of boron hydrides and ionic hydride salts.

6. The fuel cartridge system of claim 1, wherein the fuel regulator comprises a separable pump and a controller.

7. The fuel cartridge system of claim 1, wherein at least one of the fuel storage and the mixture storage chambers is bounded by a wall of which at least a portion is flexible.

8. The fuel cartridge system of claim 1, wherein both of the fuel storage and the mixture storage chambers are bounded by walls of which at least a portion is flexible.

9. The fuel cartridge system of claim 1, wherein the fuel storage chamber fuel storage area is bounded by a first flexible bag, and wherein the first flexible bag fuel storage area is further enclosed in a second flexible bag.

10. The fuel cartridge system of claim 9 wherein the first flexible bag includes a gas separation membrane for porting a gas inside the first flexible bag to the second flexible bag.

11. The fuel cartridge system of claim 1, wherein at least one of the fuel storage chamber and the mixture storage chamber is bounded by a flexible bladder.

12. The fuel cartridge system of claim 1, wherein the fuel storage module comprises a unitary storage chamber bounded by rigid walls and a movable partition disposed inside the unitary storage chamber for dividing the unitary storage chamber into the fuel storage chamber and the mixture storage chamber.

13. The fuel cartridge system of claim 12 further comprising a seal element disposed between the movable partition and the rigid walls for maintaining a seal between the fuel storage chamber and the mixture storage chamber.

14. The fuel cartridge system of claim 13 further comprising:
a plurality of hydrogen separation membranes disposed on the rigid walls for porting hydrogen gas from the mixture storage chamber to the rigid walled outer chamber; and,
a hydrogen outlet in fluid communication with the rigid walled outer chamber for transporting the hydrogen gas out of the fuel cartridge system.

15. The fuel cartridge system of claim 1, further comprising a third chamber housed within the fuel storage module for collecting hydrogen gas and a hydrogen separation membrane disposed between the mixture storage chamber and the third chamber for porting hydrogen gas from the mixture storage chamber to the third storage chamber.

16. The fuel cartridge system of claim 1, comprising:
a first gas separation membrane disposed in a wall of the mixture storage chamber for porting hydrogen gas out of the mixture storage chamber; and,
a hydrogen outlet for transporting the hydrogen gas separated from the mixture storage chamber out of the fuel cartridge system.

17. The fuel cartridge system of claim 16, wherein the first gas separation membrane comprises a material selected from the group consisting of silicone rubber, polyethylene, polypropylene, polyurethane and fluoropolymers.

18. The fuel cartridge system of claim 1 further comprising a heat exchange element for cooling the reaction chamber.

19. The fuel cartridge system of claim 1 further comprising a hydrogen generation catalyst disposed in the reaction chamber for reacting with the fuel.

20. The fuel cartridge system of claim 1 wherein the rigid walled outer chamber comprises the mixture storage chamber further comprising a hydrogen separation membrane disposed in a wall of the rigid walled outer chamber for porting hydrogen therefrom.

21. The fuel cartridge system of claim 1 wherein the rigid walled outer chamber comprises a hydrogen storage chamber further comprising a hydrogen separation membrane disposed in a wall of the mixture storage chamber for porting hydrogen from the mixture storage chamber to the rigid walled outer chamber.

22. The fuel cartridge system of claim 1 wherein each of the fuel storage chamber and the mixture storage chamber comprises a flexible bladder.

23. The fuel cartridge system of claim 1:
wherein the fuel storage and the mixture storage chambers are in a volume exchange formation, bounded by a common moveable partition; and
wherein said partition comprises at least one membrane capable of allowing hydrogen formed prematurely in the fuel storage chamber to escape into the mixture storage chamber.

* * * * *